(12) United States Patent
Bretschneider et al.

(10) Patent No.: US 12,186,908 B2
(45) Date of Patent: Jan. 7, 2025

(54) FORCE-LIMITED MOVEMENT OF AT LEAST ONE ELEMENT OF A PRODUCTION MACHINE IN MANUAL OPERATION

(71) Applicant: Siemens Aktiengesellschaft, Munich (DE)

(72) Inventors: Jochen Bretschneider, Owingen (DE); Steffen Mihatsch, Renningen (DE); Curd Weber, Sulzfeld (DE)

(73) Assignee: Siemens Aktiengesellschaft, Munich (DE)

( * ) Notice: Subject to any disclaimer, the term of this patent is extended or adjusted under 35 U.S.C. 154(b) by 248 days.

(21) Appl. No.: 17/428,210

(22) PCT Filed: Dec. 19, 2019

(86) PCT No.: PCT/EP2019/086166
§ 371 (c)(1),
(2) Date: Aug. 3, 2021

(87) PCT Pub. No.: WO2020/160829
PCT Pub. Date: Aug. 13, 2020

(65) Prior Publication Data
US 2022/0118614 A1    Apr. 21, 2022

(30) Foreign Application Priority Data
Feb. 4, 2019 (EP) .................... 19155244

(51) Int. Cl.
*B25J 9/16* (2006.01)
*G05B 19/4061* (2006.01)
(52) U.S. Cl.
CPC .......... *B25J 9/1633* (2013.01); *B25J 9/1676* (2013.01); *G05B 19/4061* (2013.01); *G05B 2219/39319* (2013.01)

(58) Field of Classification Search
CPC ... B25J 9/1633; B25J 9/1676; G05B 19/4061; G05B 2219/39319
See application file for complete search history.

(56) References Cited

U.S. PATENT DOCUMENTS 5,014,183 A * 5/1991 Carpenter ............ G05B 19/425
                                                        700/254
10,029,369 B1 * 7/2018 Carlisle .................... B25J 9/042
(Continued)

FOREIGN PATENT DOCUMENTS

CN    103123477 A    5/2013
CN    104516313 A    4/2015
(Continued)

OTHER PUBLICATIONS

Schmirgel, Heiko et al: "Tuning—Antriebsinterne Frequenzanalyse"; Kollmorgen Deutschland GmbH; 40880 Ratingen; Deutschland; found on the Internet: https://www.kollmorgen.com/de-de/developer-network/tuning-antriebsinterne-frequenzanalyse/; XP055764755.
(Continued)

*Primary Examiner* — Khoi H Tran
*Assistant Examiner* — Nhi Q Bui
(74) *Attorney, Agent, or Firm* — Henry M. Feiereisen LLC

(57) ABSTRACT

A control device of a production machine receives a present path and a movement command from an operator during manual operation of the production machine. An element of the production machine should be moved along the present path by means of position-controlled axes. Based on the movement command, a series of position setpoint values having a setpoint velocity is determined for the axes. The control device determines from the position setpoint values and corresponding position actual values control commands for the drives driving the axes and controls the drives accordingly. The determined control commands limit a (Continued)

contact force (F), which the at least one element exerts on its environment, to a force limit value (F0) specified to the control device. The control device monitors a following error of the drives and suppresses further movement of the element when the following error reaches a maximum value.

17 Claims, 10 Drawing Sheets

(56) References Cited

U.S. PATENT DOCUMENTS

| | | | |
|---|---|---|---|
| 10,112,297 B2* | 10/2018 | Shimodaira | B25J 13/085 |
| 2009/0048713 A1 | 2/2009 | Glissmann et al. | |
| 2014/0379126 A1 | 12/2014 | Ueberle | |
| 2015/0094848 A1 | 4/2015 | Bretschneider et al. | |
| 2015/0378347 A1* | 12/2015 | Sato | G05B 19/4063 |
| | | | 700/193 |
| 2016/0089787 A1* | 3/2016 | Kuroshita | B25J 9/1674 |
| | | | 901/1 |
| 2016/0176048 A1* | 6/2016 | Zimmermann | B25J 9/1664 |
| | | | 901/46 |
| 2018/0154519 A1* | 6/2018 | Lin | B25J 13/085 |
| 2020/0238530 A1* | 7/2020 | Kumagai | B25J 19/04 |
| 2021/0138641 A1 | 5/2021 | Kogan | |

FOREIGN PATENT DOCUMENTS

| | | | | |
|---|---|---|---|---|
| DE | 102005015317 | A1 | 10/2006 | |
| DE | 102015012230 | A1 | 3/2016 | |
| DE | 102016210060 | A1 | 12/2017 | |
| DE | 102017005581 | A1 | 12/2018 | |
| JP | 2019206080 | A * | 12/2019 | B25J 19/06 |
| WO | WO 2008095950 | A1 | 8/2008 | |
| WO | WO 2018049447 | A1 | 3/2018 | |

OTHER PUBLICATIONS

PCT International Search Report and Written Opinion of International Searching Authority mailed Jun. 4, 2020 corresponding to PCT International Application No. PCT/EP2019/086166 filed Dec. 19, 2019.

* cited by examiner

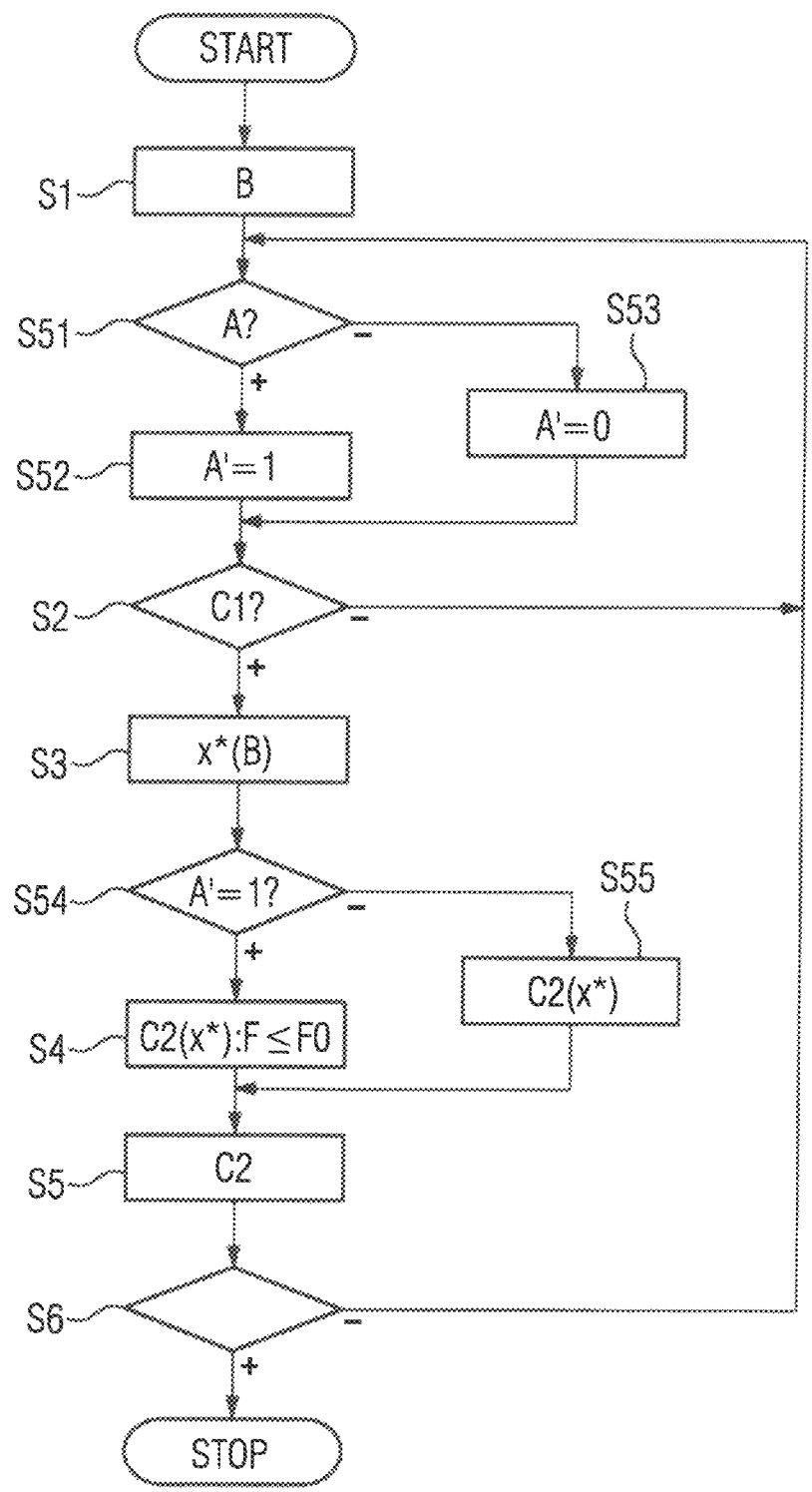

FORCE-LIMITED MOVEMENT OF AT LEAST ONE ELEMENT OF A PRODUCTION MACHINE IN MANUAL OPERATION

CROSS-REFERENCES TO RELATED APPLICATIONS

This application is the U.S. National Stage of International Application No. PCT/EP2019/086166, filed Dec. 19, 2019, which designated the United States and has been published as International Publication No. WO 2020/160829 A1 and which claims the priority of European Patent Application, Ser. No. 19/155,244.7, filed Feb. 4, 2019, pursuant to 35 U.S.C. 119 (a)-(d),

BACKGROUND OF THE INVENTION

The present invention is based on an operating method for a production machine,
wherein a control device of the production machine receives a present path and a movement command from an operator of the production machine via an input device of a human-machine interface during manual operation of the production machine,
wherein at least one element of the production machine is to be moved along the present path in a movement direction by means of position-controlled axes,
wherein the control device determines a series of position setpoint values for the axes on the basis of the movement command,
wherein the position setpoint values advance with a setpoint velocity in the movement direction along the present path,
wherein the control device determines, on the basis of the position setpoint values and corresponding position actual values, control commands for the drives driving the axes and controls the drives accordingly,
wherein the control device determines the control commands such that a contact force, with which the at least one element acts on its environment, is limited to a force limit value specified to the control device.

The present invention is further based on a control program for a control device of a production machine, wherein the control program comprises machine code that can be processed by the control device, wherein the processing of the machine code by the control device causes the control device to operate the production machine in accordance with an operating method of this kind.

The present invention is further based on a control device for a production machine, wherein the control device is programmed with a control program of this kind such that during operation the control device operates a production machine in accordance with an operating method of this kind.

The present invention is further based on a production machine, wherein the production machine has at least one position-controlled axis, by means of which at least one element of the production machine is moved in a position-controlled manner, wherein the production machine is controlled by a control device of this kind.

Manual operation is known in numerically controlled machine tools and other numerically controlled production machines. In manual operation the operator of the production machine moves the machine axes by manually specifying movement commands. The movement can take place both individually for each axis and also in combination. Manual operation can be adopted for example during setup, during gauging or in single block mode.

In the manual method it can easily happen that the operator maneuvers the production machine into a confusing situation in which it is not immediately apparent how to get out of said situation again. In particular if the moved element of the production machine touches or almost touches another element of the production machine very small movements can often result in damage to the production machine or to a workpiece that is being handled by means of the production machine. Although undesired collisions of this kind should be prevented as far as possible, they do nevertheless sometimes occur.

In the prior art it is known for the travel movement to be recorded in the form of a history, such that in the event of a collision it is also possible to move back to the starting point on exactly the same path on which a position was adopted (Retract). This procedure is not always possible, nor always practicable. In particular in cases in which contact has already occurred between different elements and as a result for example elements have been bent, this procedure too can fail.

Another possibility is for a collision calculation to be performed with a virtual machine model in parallel to the movement. Firstly this requires the necessary computing power. Secondly the model must be complete and correct. In particular in cases in which a collision has already occurred and elements have been bent as a result of the collision, no reliable protection is any longer provided with this procedure either. Furthermore, a collision calculation of this kind is not available for all production machines.

In the prior art the only option often left in consequence for the operator of the production machine is hence to act with great care and circumspection and to retract the element from the complex situation again. The selection of a single incorrect movement direction with subsequent movement of the element can be fatal here. There is hence a high risk of operating errors. This applies very particularly if the operator does not have a good view of the situation, which is often the case.

DE 10 2015 012 230 AI discloses a robot controller which has multiple position-controlled axes. In DE 10 2015 012 230 AI, in particular in a return mode referred to there as such, a position-controlled movement takes place from a position A to a position B, wherein torque limiting takes effect during the movement from position A to position B, Position A has previously been approached manually by an operator. Position B is produced by a program which has a series of positions. Position B is approached, starting from position A, and the operator clears the movement.

DE 10 2017 006 581 AI discloses an operating method for a robot, in which a setpoint force is specified with which a contact point may be acted upon, and wherein furthermore the robot is braked even before this setpoint force is reached.

DE 10 2016 210 000 AI discloses manipulator systems in which manipulators are operated directly by a human. The manipulators can be moved on a position-controlled basis and simultaneously on a force-limited basis.

DE 10 2005 015 317 AI discloses a production machine in which the machine elements are moved on a position-controlled basis and a collision is identified as soon as a force acting on the machine element exceeds a force limit value.

The object of the present invention is to create easily realizable opportunities, by means of which damage to elements of the production machine can be reliably prevented.

SUMMARY OF THE INVENTION

The object is achieved by an operating method as set forth hereinafter. Advantageous embodiments of the inventive operating method form the subject matter of dependent claims.

According to the invention an operating method of the type mentioned in the introduction is configured such that the control device monitors a following error of the drives for adherence to a predefined maximum value and suppresses further movement of the at least one element of the production machine if the maximum value is reached.

This means it is easy to recognize when the at least one element of the production machine has collided with an obstacle, and to respond to this accordingly in that the further specification of advancing position setpoint values is stopped.

It is possible for the contact force to be limited as an absolute value. Alternatively or additionally it is possible for the contact force to be limited component by component for the individual axes and/or component by component for directions orthogonal to one another.

The control device preferably determines the control commands for the drives in that it first determines, by means of position controllers assigned to the drives, velocity setpoint values for velocity controllers subordinate to the position controllers on the basis of the position setpoint values and the corresponding position actual values, then on the basis of the velocity setpoint values and corresponding velocity actual values determines force setpoint values for force controllers subordinate to the velocity controllers and upstream of the drives, limits the force setpoint values to the specified limit value or a value derived therefrom and determines the control commands for the drives by means of the force controllers. In this way the limitation of the contact force to the desired limit value can easily be achieved. It may be mentioned here that the velocity controllers can be "genuine" velocity controllers. Alternatively they can also be controllers equivalent to these. This also applies analogously for the force controllers. Here too, controllers equivalent to these can be used as an alternative.

The position controllers are preferably embodied as P controllers.

The control device preferably receives a measurement value for a movement force with which the drives act on the at least one element (in other words the force actually exerted by the drives), determines the contact force on the basis of the measurement value received and suppresses a further movement of the at least one element in the movement direction if and as soon as the determined contact force reaches the specified limit value. This means that if the element collides with an obstacle it is possible to respond easily, quickly and reliably.

In the simplest case the measurement value for the movement force is evaluated just as it is, as a contact force. Only a kinematic conversion is carried out, where necessary. However, the control device preferably determines, on the basis of the position actual values of the axes, an acceleration and/or the movement velocity of the at least one element and determines and takes into account in the determination of the contact force a force component caused by the acceleration and/or the velocity of the at least one element. This means the assessment of the actual current size of the contact force can be improved.

The control device preferably limits the setpoint velocity to, a velocity limit value specified to the control device. This means that kinetic energy built up as a result of the movement of the at least one element of the production machine stays correspondingly low.

In a preferred embodiment the control device monitors the contact force and when the specified force limit value is reached reverses the movement direction, a direction of the setpoint velocity and/or a direction of a setpoint force. This means that the undesired buildup of the contact force of the at least one element of the production machine with an obstacle is automatically counteracted.

In a particularly preferred embodiment of the present invention it is provided that the control device temporarily stores the series of position setpoint values and/or the associated position actual values in a buffer memory and that the control device, if after the movement of the at least one element of the production machine in the movement direction it moves the at least one element of the production machine counter to the movement direction, utilizes the position setpoint values and/or position actual values stored in the buffer memory in a sequence which is inverse compared to that of the storage. This means the element of the production machine can easily be retracted on the right path.

The control device preferably displays the contact force to the operator via the human-machine interface as an absolute value, component by component for the individual axes and/or component by component for directions orthogonal to one another. Because of the display, information about the contact force occurring is available to the operator of the production machine at any time.

The control device preferably applies a haptically detectable acknowledgment dependent on the contact force to an actuation element for specification of the movement command. This means that information about the contact force occurring is available to the operator of the production machine at all times, even if said operator is not able to take a look at a display device of the human-machine interface.

It is possible for the control device to execute the inventive method in manual operation at any time. It is however likewise possible for the control device to only execute the inventive method if the control device has previously received an activation command from the operator via the human-machine interface, and failing which the at least one element of the production machine moves to the force limit value without limitation of the contact force. This means that—depending on the individual situation—a faster movement of the element of the production machine can be effected.

The object is further achieved by a control program which is configured such that the processing of the machine code by the control device causes the control device to operate the production machine in accordance with an inventive operating method.

The object is further achieved by a control device which is programmed with an inventive control program, such that during operation the control device operates the production machine in accordance with an inventive operating method.

The object is further achieved by a production machine which is controlled by an inventive control device.

BRIEF DESCRIPTION OF THE DRAWING

The properties, features and advantages of this invention described above and the manner in which they are achieved will become clearer and more readily understandable in conjunction with the following description of the exemplary embodiments, which are explained in greater detail in connection with the drawings, which show in schematic form.

DETAILED DESCRIPTION OF PREFERRED EMBODIMENTS

Figure 1:
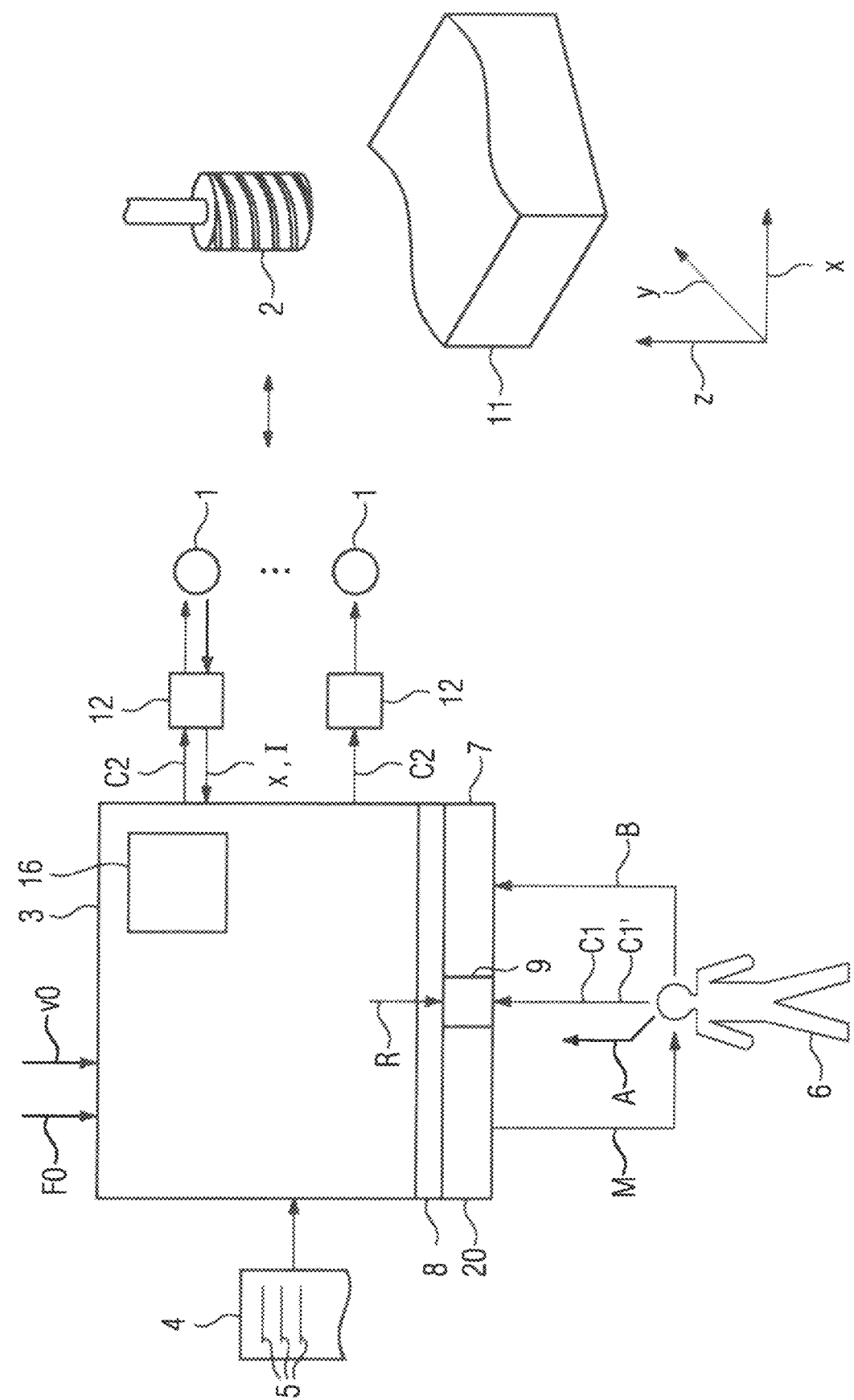
FIG. 1 a production machine and associated components,
FIG. 2 a sequence chart,
FIG. 3 a two-dimensional travel movement,
FIG. 4 a controller structure,
FIG. 5 a further controller structure,
FIG. 6 a sequence chart,
FIG. 7 a controller structure,
FIG. 8 a sequence chart,
FIG. 9 a sequence chart,
FIG. 10 a buffer memory,
FIG. 11 a display of a human-machine interface,
FIG. 12 a sequence chart, and
FIG. 13 a further sequence chart.

According to FIG. 1 a production machine has at least one position-controlled axis 1. Generally even multiple position-controlled axes 1 are present. By means of the position-controlled axes 1 at least one element 2 of the production machine—a tool for example in the case of a machine tool—is moved in a position-controlled manner.

The production machine is controlled by a control device 3. The control device 3 is a numeric controller (CNC) or a similarly working movement controller for controlling the position-controlled axes 1. The control device 3 is programmed with a control program 4. The control program 4 comprises machine code 5 which can be processed by the control device 3. The processing of the machine code 5 by the control device 3 causes the control device 3 to operate the production machine in accordance with an operating method which is explained in greater detail below initially in conjunction with FIG. 2.

In the context of the present invention the production machine is operated in a manual mode. In accordance with FIG. 2 the control device 3 in manual mode receives a present path B in a step S1 from an operator 6 of the production machine. The at least one element 2 is to be moved along the present path B in a movement direction. The path B is designated as present path B because it is currently specified by the operator 6. In many cases the path B can still be changed by the operator 6 in principle at any time. Only during the processing of a parts program in single block mode is the path B permanently specified as such in advance. In this case too the operator 6 specifies the path B by selecting the respective individual block of the parts program and does not specify the movement command C1 until after the respective path B has been selected.

The specification of the present path B by the operator 6 takes place via an input device 7 of a human-machine interface 8 (HMI 8) of the control device 3. The input device 7 can for example be a keyboard or a control panel of the control device 3.

The control device 3 further receives a movement command C1 from the operator 6 in a step S2. The specification of the movement command C1 takes place for example via an actuation element 9 of the human-machine interface 8. The actuation element 9 can in particular be a button or a rotary switch.

It is possible for the operator 6 to specify the present path B and the movement command C1 separately from one another. For example, the operator 6 can initially—for example by means of what is known as a G1 command—specify a position to be approached of the at least one element 2 and then specify the movement command C1. In this case the at least one element 2 is moved to the position to be approached as from the specification of the movement command C1 This mode of operation is known to persons skilled in the art by the term MDA.

It is however likewise possible for the operator 6 to specify the present path B and the movement command C1 jointly as an indivisible unit. For example, the operator 6 can select an individual axis 1 and then actuate a direction button for the forward direction or a direction button for the reverse direction of the selected axis 1. Instead of the direction button a rotary wheel can also be present, which the operator can rotate forward or back. If the present path B and the movement command C1 are specified jointly as an indivisible unit the at least one element 2, starting from the present position, is always moved further until the operator 6 no longer specifies the movement command C1.

Figure 3:
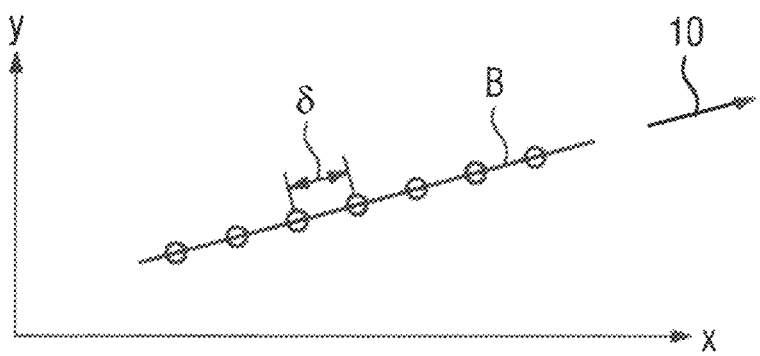

Mixed forms are also possible. For example, the operator 6 can specify a direction, wherein to move the at least one element 2 in this direction multiple axes 1 must be controlled, but the movement of the at least one element 2 in the specified direction takes place only as long as the operator 6 specifies the movement command C1—where appropriate making the forward/back distinction. In this case the operator 6 directly or indirectly defines a relationship or multiple relationships, in which during the subsequent movement of the at least one element 2 multiple axes 1 of the production machine are controlled simultaneously. If—for example—each one of the axes 1 moves the at least one element 2 in the x, y and z direction of a Cartesian coordinates system, the operator 6 can for example specify a direction which according the illustration in FIG. 3 runs principally in the x direction but additionally has a small y component. The movement direction is indicated in FIG. 3 by the direction of the arrow 10 marked there. However, other paths B can of course also be specified. It is even possible to specify present paths B that do not run straight, for example a circular path.

In connection with the following explanations, only the x component is ever discussed. However, the corresponding explanations also apply in principle for the y component and the z component and—if present—further components too, for example orientations of the at least one element 2 in space.

In step S3 the control device 3 in each case determines position setpoint values for the axes 1, for example $x^*$. The determined position setpoint values $x^*$—illustrated in FIG. 3 by the individual points on path B—gradually advance, according to the lustration in FIG. 3, on the present path B, wherein furthermore a maximum permissible distance δ between immediately consecutive position setpoint values $x^*$ is adhered to. Since the position setpoint values $x^*$ are usually generated by the control device 3 on a docked basis (for example with a time interval of 1 ms), the sequence of position setpoint values $x^*$ corresponds to a setpoint velocity $v^*$, also designated below as a velocity setpoint value $v^*$. The setpoint velocity $v^*$ arises as a quotient of the respective distance δ and of the time interval.

The statement that the position setpoint values $x^*$ advance along the present path B with a setpoint velocity $v^*$ is intended to mean that the position setpoint values $x^*$ change according to the present path B. Normally this is also connected to a corresponding movement of the element 2 and thus an actual velocity v. Normally the corresponding position actual values x thus also change accordingly. In connection with step S3 the only requirement is however that the position setpoint values $x^*$ change accordingly. It is thus not ruled out that the at least one element 2 does not follow the movement actually required—as defined by the position setpoint values x*, thus that the position actual values x do not change at all or at least only follow the position setpoint values x* insufficiently.

The control device 3 usually determines the position setpoint values x* such that the position setpoint values x* have a constant distance from one another, such that the setpoint velocity v* is also constant. However, in each case the control device 3 limits the setpoint velocity v* to a velocity limit value v0. The velocity limit value v0 is specified to the control device 3. For example, it can be established by the control program 4. However, it is also possible for the velocity limit value v0 to be specified to the control device 3 by the operator 6 or in some other way. The limiting of the setpoint velocity v* is an additional safety measure.

Regardless of the way in which the velocity limit value v0 is specified to the control device 3, the velocity limit value v0 is selected to be relatively low. This ensures that in the event that the at least one element 2 collides with an obstacle 11 because of the travel movement—for example a processed workpiece or another element of the production machine—relatively little damage, if any, is done to the at least one element 2 and/or the obstacle 11. The velocity limit value v0 specifically required for this results from the inertia of the axes 1 in question in conjunction with the rigidity of the elements 2 of the production machine.

In a subsequent step S4 the control device 3 determines, on the basis of the position setpoint values x* and corresponding position actual values x, control commands C2 for drives 12 which drive the axes 1. The determination of step S4 takes place such that a contact force F is limited to a force limit value F0. The contact force F is the force with which the at least one element 2 acts on its environment. The environment is here not the surrounding air or the like, but other elements 2 of the production machine or other established obstacles 11 and the like. The limitation of the contact force F can if need be take place as an absolute value, component by component for the individual axes 1 and/or component by component for directions orthogonal to one another. The determination of the control commands C2 can take place for example according to the illustration hi FIG. 4 using position controllers 13. The position controllers 13 are, where present, assigned to the individual drives 12.

Figure 4:
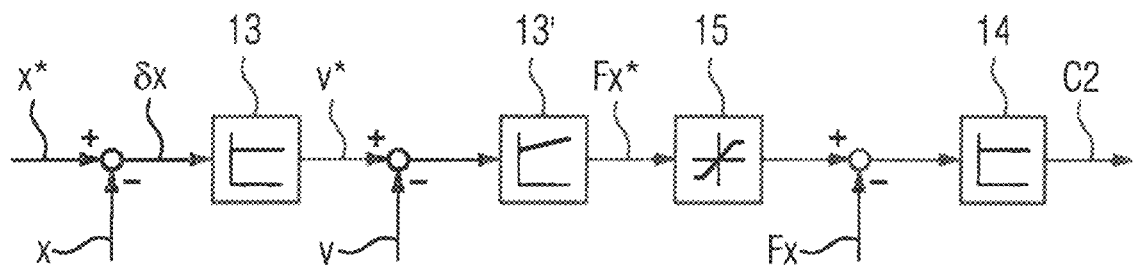

The procedure in accordance with FIG. 4 initially covers the case in which the at least one element 2 is moved in a particular direction and hereby strikes an obstacle 11 orthogonally. The procedure in accordance with FIG. 4 however also covers the case hi which the at least one element 2 is moved in a particular direction and hereby strikes an obstacle 11 at an angle—in particular a small angle—different from 90°. This is because as a result of the obstacle 11 being struck a contact force F arises which not only has a component hi the direction in which the at least one element 2 is moved, but also a component orthogonal thereto. The orthogonal component can readily be determined, for example on the basis of a detection of the current required for retaining a position. By taking account of the individual components of the contact force F in space or of the absolute value of the contact force F or of the components for all axes 1 a case such as this can hence readily also be detected and covered at the same time.

The force omit value F0 is specified to the control device 3. It can for example be established by the control program 4. However, it is also possible for the force limit value F0 to be specified to the control device 3 by the operator 6 or in some other way. Regardless of how the force limit value F0 is specified to the control device 3, the force limit value F0 is selected to be low, such that any damage caused to the moved element 2 and/or to the obstacle 11 if the element 2 collides with the obstacle 11 because of the travel movement is minimized.

In a step S5 the control device 3 issues the determined control commands C2 to the drives 12 and thereby controls the drives 12 accordingly. The control device 3 consequently thus does in fact determine the control commands C2 for the drives 12 and controls the drives 12 accordingly. The contact force F this causes is however limited to the specified force limit value F0 because of the corresponding determination in step S4.

Figure 2:
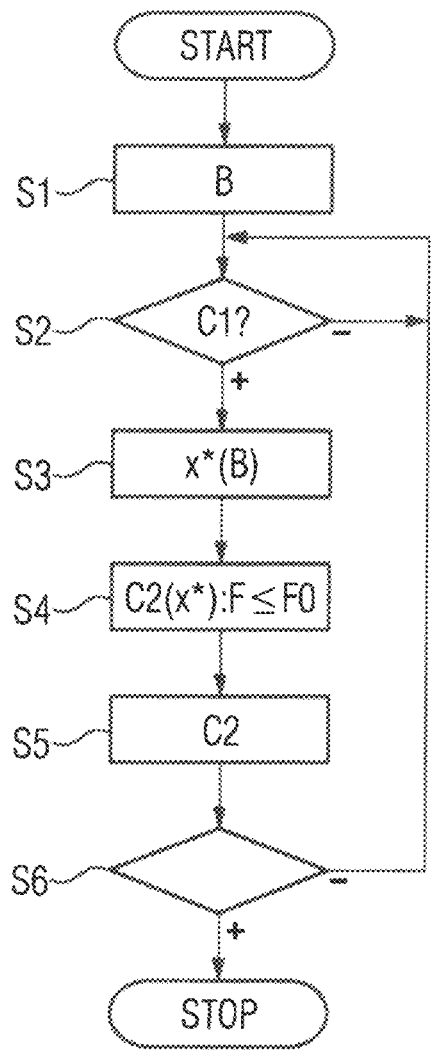

In a step S6 the control device 3 checks whether the procedure in FIG. 2 should be terminated. If and as long as this is not the case, the control device 3 returns to step S2 or S3. Where necessary, another check is made to determine whether the operator 6 is still specifying the movement command C1. Step S6 as such is not the subject matter of the present invention.

To ensure that the control commands C2 determined in step S4 and issued to the drives 12 in step S5 actually cause the contact force F to be limited to the force limit value F0, various procedures are possible. For example, according to the illustration in FIG. 4 it is possible for the control device 3 to comprise velocity controllers 13' and force controllers 14. The velocity controllers 13' are subordinate to the position controllers 13, the force controllers 14 in turn are subordinate to the velocity controllers 13'. The force controllers 14 are upstream of the drives 12.

The velocity controllers 13' can be "genuine" velocity controllers. Alternatively they can also be controllers equivalent to these, such as speed controllers or the like for example. Analogously the force controllers 14 can be "genuine" force controllers. Alternatively they can be controllers equivalent to these, such as torque controllers or current controllers for example.

The control device 3 determines velocity setpoint values v* for the subordinate velocity controllers 13' by means of the position controllers 13 on the basis of the position setpoint values x* and the corresponding position actual values x. The control device 3 further determines force setpoint values Fx* for the force controllers 14 by means of the velocity controllers 13' on the basis of the velocity setpoint values x* and corresponding velocity actual values v. The control device 3 in turn limits the force setpoint values Fx* to the specified force limit value F0 or a value derived therefrom.

Figure 5:
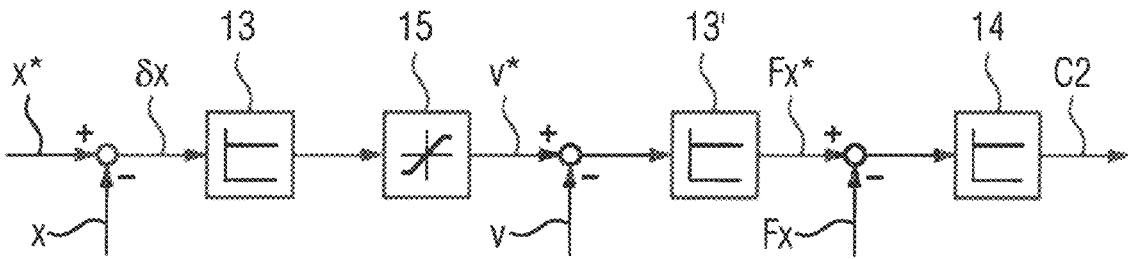

In order to limit force setpoint values Fx*, limiters 15 can be arranged between the position controllers 13 and the force controllers 14, said limiters 15 limiting the force setpoint values Fx* to the specified force limit value F0 or—for example if the force limit value F0 is split over multiple axes 1—a value derived therefrom. If the velocity controllers 13' according to the illustration in FIG. 4 are embodied as PI controllers, the limiters 15 must be arranged downstream of the velocity controllers 13', in other words between the velocity controllers 13' and the force controllers 14. Even if the velocity controllers 13' according to the illustration in FIG. 5 are embodied as pure P controllers, the limiters 15 can be arranged downstream of the velocity controllers 13', in other words between the velocity controllers 13' and the force controllers 14. In this case it is however alternatively likewise possible for the limiters 15 to be upstream of the velocity controllers 13', in other words to be arranged between the position controllers 13 and the velocity controllers 13' or even to be upstream of the position controllers 13.

In the case of the configuration in accordance with FIGS. 4 and 5 the control device 3 determines the control commands C2 for the drives 12 by means of the force controllers 14. Since the correspondingly limited force setpoint values (and also the associated force actual values Fx) are fed to the force controllers 14, the control commands C2 are also determined accordingly.

Above all however a procedure is possible which is explained below in conjunction with FIG. 6. This procedure can be combined if need be with the configuration in accordance with FIG. 4 and/or the configuration in accordance with FIG. 5.

Figure 6:
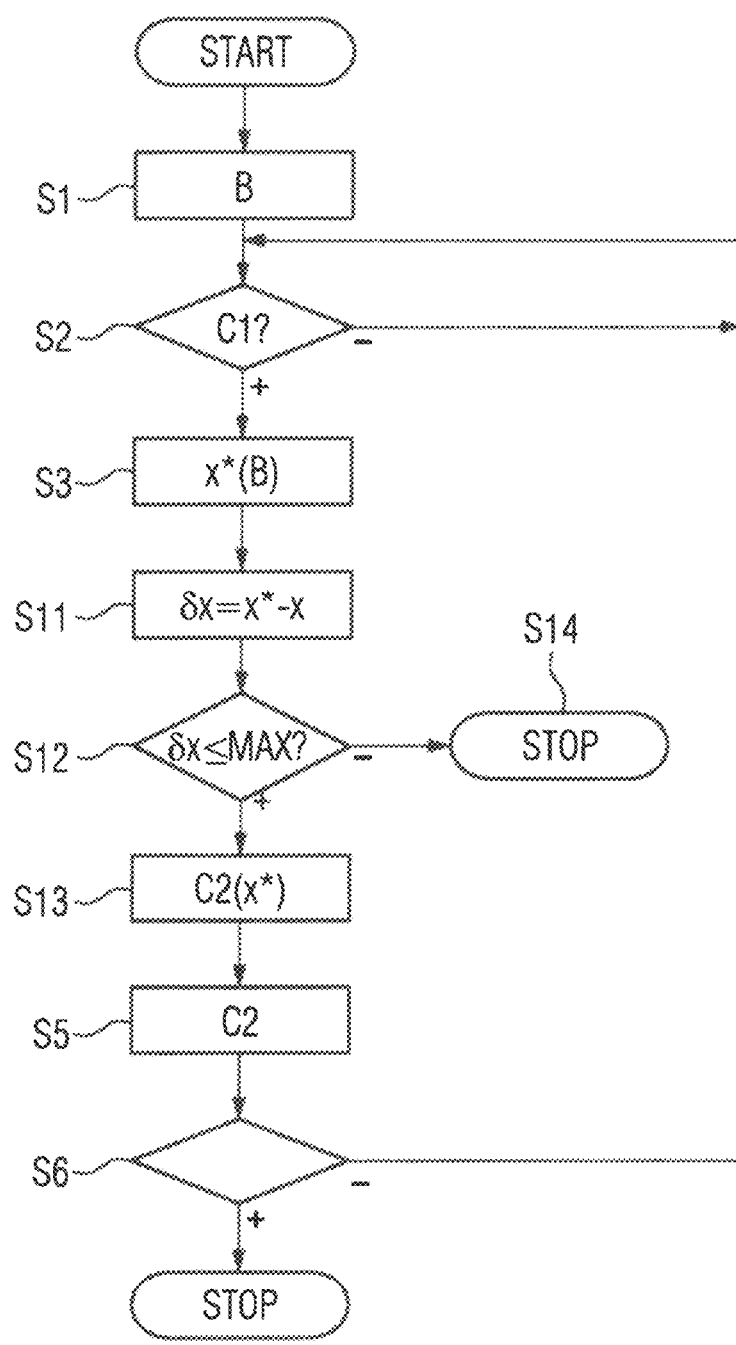

In the case of the configuration in FIG. 6 too, the control device 3 comprises position controllers 13 for the axes 1 (normally with subordinate speed controllers 13') and force controllers 14. The position setpoint values x* and the position actual values x are fed to the position controllers 13, as usual, by the control device 3. The position controller 13 is preferably embodied as a pure P controller. If present, the velocity controller 13' is preferably also embodied as a pure P controller. If position controllers 13 with subordinate force controllers 14 are present, step S4 is replaced according to the illustration in FIG. 6 by steps S11 to S14.

In step S11 the control device 3 determines a following error δx of the drives 12. The term "following error" has an unambiguous meaning for the person skilled in the art. It relates to the difference between position setpoint value x* and position actual value x, if appropriate also the absolute value of this difference. The following error δx thus corresponds to the control deviation of the associated position controller 13. In step S12 the control device 3 monitors the following error δx for adherence to a predefined maximum value MAX. If and as long as the following error δx stays below the maximum value MAX, the control device 3 determines in step S13 either just as in step S4 with or alternatively without limitation of any force setpoint values Fx*—the control commands C2 for the drives 12 and issues the control commands C2 to the drives 12 in step 35. However, as soon as the following error δx exceeds the maximum value MAX, the control device 3 skips to step S14. In step S14 the control device 3 suppresses a further movement of the element 2. As a matter of form it may be mentioned that in the singular case in which the following error δx is exactly the same as the maximum value MAX, the control commands C2 can furthermore be determined if need be and issued to the drives 12 or the further movement of the element 2 can be suppressed.

The procedure in FIG. 6 is in particular advantageous if the position controller 13 and the speed controller 13' are embodied as proportional controllers in accordance with the illustration in FIG. 5, i.e. the output signal of the position controller 13 is proportional to the following error δx and the speed controller 13' does not have an integral-action component. The quotient between the output signal of the position controller 13 and the following error δx, i.e. the proportional gain of the position controller 13, is in this case proportional to the force setpoint value Fx*. Hence it is possible to determine the following error δx such that the force setpoint value Fx* stays below the predefined force limit value F0.

Figure 7:
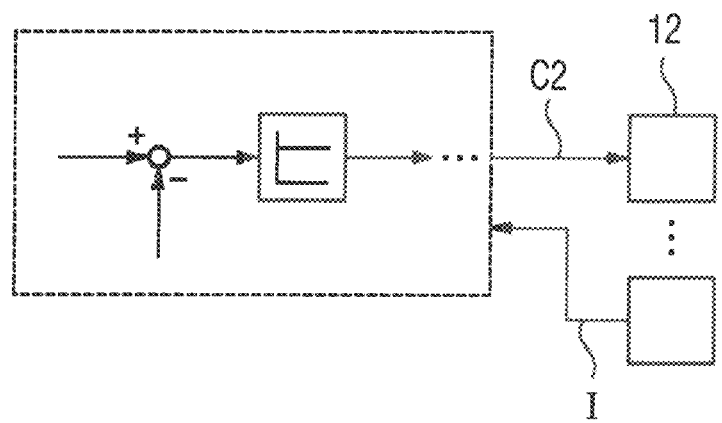

Likewise it is possible for the control device 3 in accordance with the illustration in FIG. 7 to receive a measurement value I for a movement force F', with which the drives 12 act on the element 2. For example, the control device 3 can receive a respective current measurement value from the drives 12 which substantially corresponds to the torque generated by the respective drive 12 and thus to the force applied by the respective drive 12.

Figure 8:
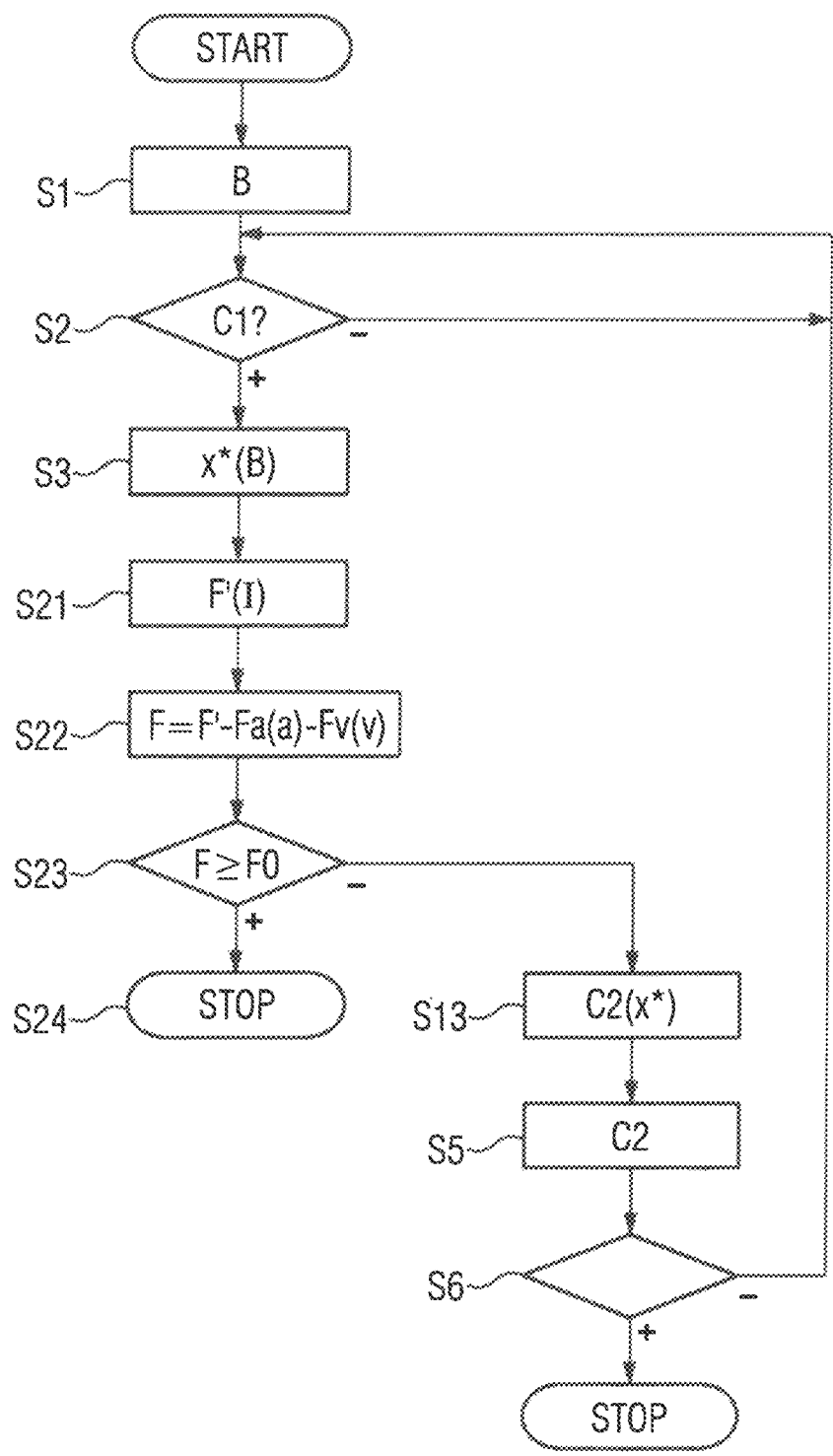

In this case it is possible for the control device 3, according to the illustration in FIG. 8, to receive the corresponding measurement value I in a step S21 and to determine the movement force F' therefrom. The control device 3 then determines the associated contact force F in a step S22. In the simplest case the determined movement force F' is simply taken over as a contact force F in step S22. However, in step S22 the control device 3 preferably determines the movement velocity v and, on the basis of the movement velocity v, a velocity-dependent force component Fv. The velocity-dependent force component Fv corresponds substantially to the friction force that must be applied to move the element 2. Alternatively or additionally the control device 3 can in step S22 determine an acceleration a of the element 2 and on the basis of the acceleration a an acceleration-dependent force component Fa. The acceleration-dependent force component Fa corresponds to the force that must be applied to accelerate the element 2. The determination of such force component Fa, Fv is known to persons skilled in the art. Purely by way of example, reference can be made to the procedure in accordance with IMD (Integrated Monitoring and Diagnosis) in Sinumerik.

Depending on which of these two determinations takes place, in step S22 the control device 3 takes account of the velocity-dependent force component Fv and/or the acceleration-dependent force component Fa during the determination of the contact force F. In particular, the control device 3 can in step S22 determine the contact force F by subtracting the velocity-dependent force component Fv and/or the acceleration-dependent force component Fa from the movement force F' determined in step S21.

Regardless of how step S22 is specifically configured, the control device 3 monitors the contact force F in a step S23 for adherence to the predefined force limit value F0. If and as long as the contact force F does not exceed the predefined force limit value F0, the control device 3 furthermore determines with or without limitation of any force setpoint values Fx*—the control commands C2 for the drives 12 and issues the control commands C2 to the drives 12. However, as soon as the contact force F exceeds the predefined force limit value F0, the control device 3 skips to a step S24. In step S24 the control device 3 suppresses a further movement of the element 2. As a matter of form it may be mentioned that in the singular case in which the contact force F is exactly the same as the specified force limit value F0, the control commands C2 can if need be furthermore be determined and issued to the drives 12 or the further movement of the element 2 can be suppressed.

Even better than a simple stop is an immediate reduction in the contact force F. This is explained in greater detail below in conjunction with FIG. 9.

Figure 9:
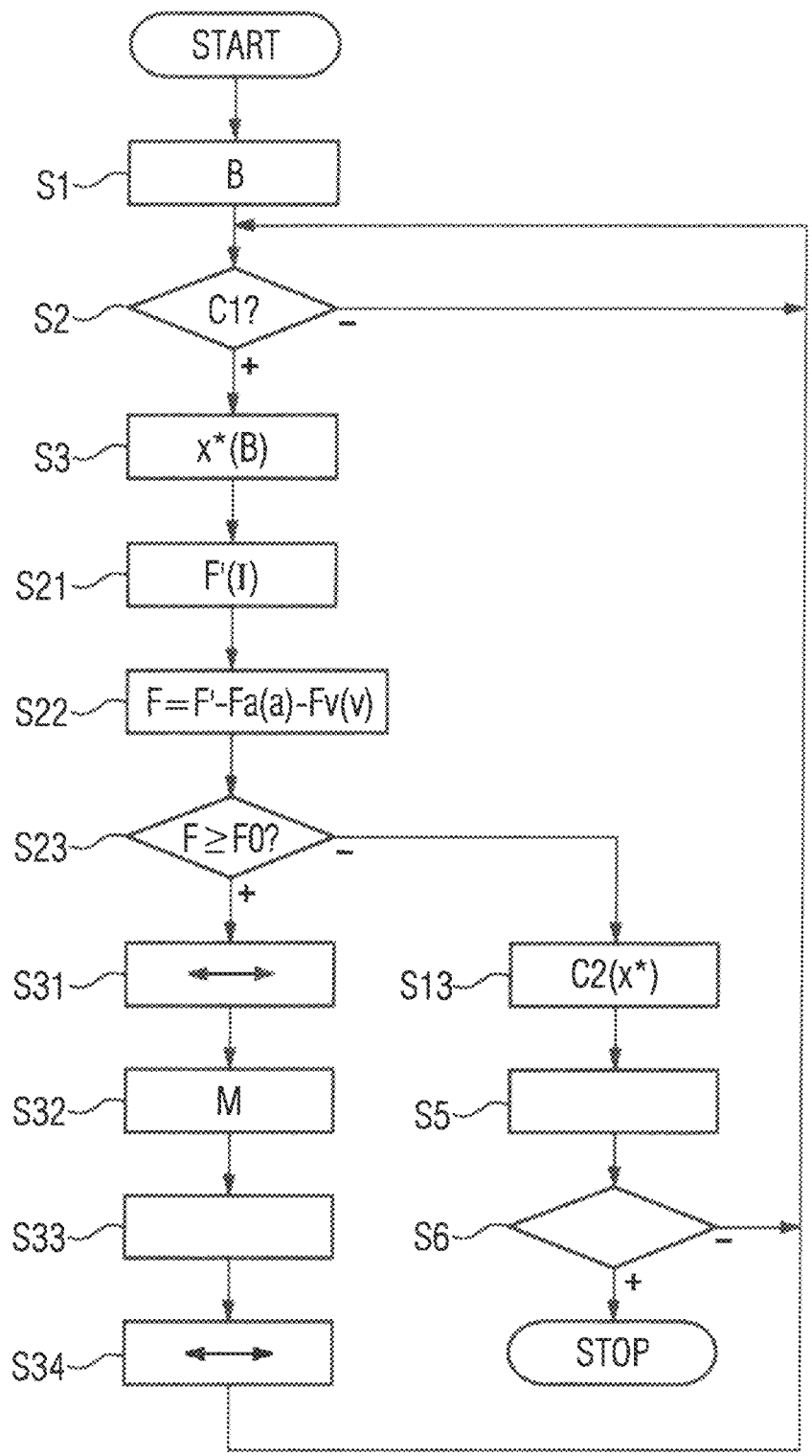

In connection with the procedure in accordance with FIG. 9 the control device 3—analogously to the procedure in FIG. 8—monitors the movement force F for adherence to the force limit value F0. Step S24 is however replaced by a step S31, which if appropriate can be supplemented with a step S32. In step S31 the control device 3 reverses the movement direction. The control device 3 thus moves the dement 2 in the opposite direction from which the element 2 previously came. In step S32 a corresponding message M can be issued to the operator 6. For example, a corresponding message can light up or flash up on a display of the human-machine interface 8.

To implement step S31 it is possible for the control device 3 to reverse the movement direction as such. Alternatively or additionally, it is possible for the control device 3 to reverse the direction of the setpoint velocity v* and/or a direction of the setpoint force Fx*. In particular the reversal of the direction of the setpoint force Fx* often results more quickly in an actual reversal of direction of the travel movement than a simple reversal of the movement direction.

It is possible for the control device 3 to return from step S31 or from step S32 directly to step S2 or to step S3. However, it is also possible for steps S33 and S34 to be downstream of step S31 or step S32 according to the illustration in FIG. 9. In this case the control device 3 initiates the retraction automatically in step S33. The retraction can take place for example for a particular distance or until the contact force F has become sufficiently small. In step S34 a renewed reversal of direction takes place in this case, such that movement is again in the original movement direction.

Figure 10:
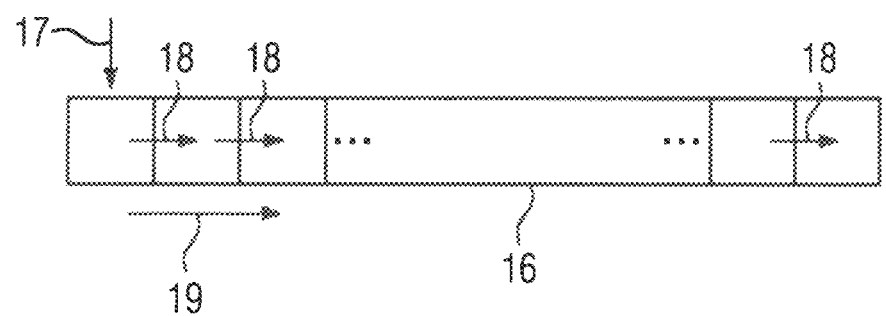

In particular to enable the automatic retraction to take place in a simple and efficient manner, the storage device 3—see FIG. 1—can have a buffer memory 16. When the element 2 is being moved in the movement direction the control device 3 stores the series of position setpoint values x* and/or the associated position actual values x temporarily in the buffer memory 16. The storage can take place for example such that the current position setpoint value x* and/or the current position actual value x, as indicated in FIG. 10 by an arrow 17, is always saved in the same memory location of the buffer memory 16. The position setpoint values x* and/or position actual values x already stored in the buffer memory 16 are, as indicated in FIG. 10 by arrows 18, always shifted one memory location further in the manner of a shift register. If the buffer memory 16 is full, the oldest stored value in each case is deleted. As a result the previous movement sequence is stored in the buffer memory 16 for a limited time. The time limit is determined by the size of the buffer memory 16.

If the movement direction is reversed, i.e. the element 2 is to be retracted, the values stored in the buffer memory 16 are utilized by the control device 3 in a sequence which is inverse compared to that of the storage. Thus—as in a last-in-first-out memory (a typical example of this is a stack)—the last stored value is read out first, then the value stored immediately previous to that, etc. This is indicated in FIG. 10 by an arrow 19. The read-out values are utilized as new position setpoint values during the retraction. Thanks to this procedure the element 2 is thus moved in the reverse direction. The procedure can be implemented regardless of whether the movement takes place in an automated manner counter to the movement direction or on the basis of a movement command C1, C1' of the operator 6. In both cases the retraction can take place on exactly the same path on which the operator 6 previously moved the element 2 forward.

The present invention can furthermore also be configured in further ways.

Figure 11:
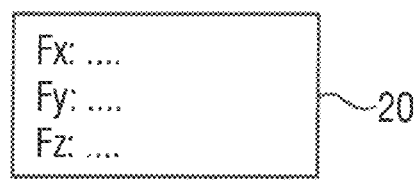

Thus it is for example possible according to the illustration in FIG. 11 for the control device 3 to provide the operator with visual feedback about the contact force F via a display device 20 of the human-machine interface 8. Preferably not only the absolute value of the contact force F is displayed here, but also the breakdown thereof into its individual components Fx, Fy, Fz, if appropriate including signs. The breakdown of the contact force F into the individual components can be made if need be for the individual axes 1 or for directions orthogonal to one another. If appropriate both breakdowns can also be made.

Figure 12:
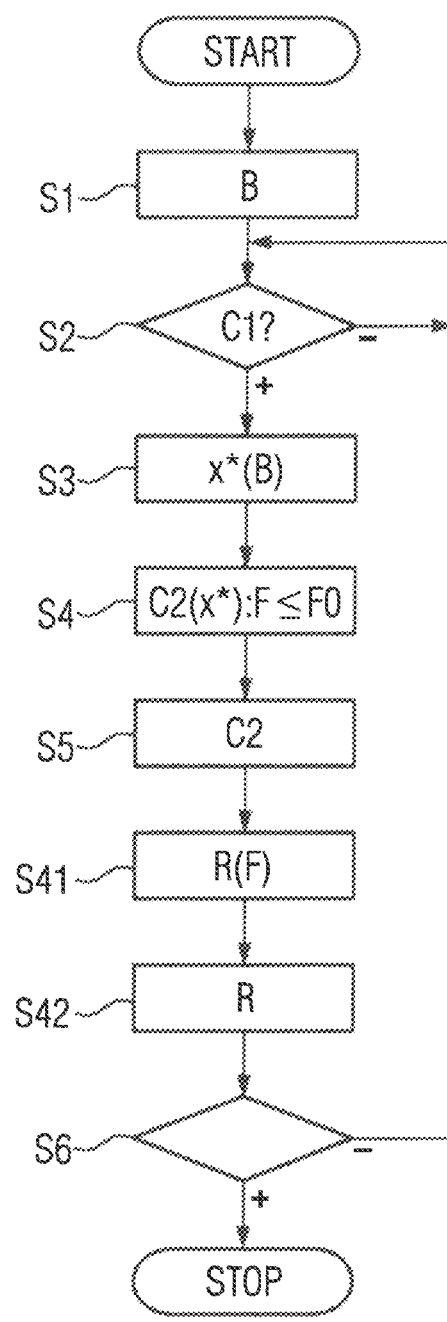

It is furthermore possible for the control device to determine a haptically detectable acknowledgment R for the actuation element 9 in accordance with the illustration in FIG. 12 in a step S41 on the basis of the previously determined contact force F and in a step S42 to apply the haptically detectable acknowledgment R to the actuation element 9. The acknowledgment R of the actuation element 9 is thus dependent on the contact force F. For example, the acknowledgment R can be such that the operator 6 has to actuate the actuation element 9 more strongly the greater the contact force F is. It is also possible for the control device 3 to set a frequency of an oscillation with which it controls the actuation element 9, as a function of the contact force F. In this case the frequency is preferably greater the greater the contact force F is.

It is furthermore possible to configure the procedure in FIG. 2—this also applies analogously for the other procedures—according to FIG. 13.

In the configuration in accordance with FIG. 13 a step S51 is upstream of step S2. In step S51 the control device 3 checks whether the operator 6 has specified an activation command A to it. Providing the operator 6 specifies the activation command A, the control device 3 sets a flag A' to the value 1 in a step S52. Otherwise the control device 3 sets the flag A' to the value 0 in a step S53. The specification of the activation command A can take place for example by actuating an additional button. Other procedures are also possible.

In a step S54 the control device 3 checks whether the flag A' has the value 1. If it does, the control device 3 executes step S4. This means that—at least as a result—the control commands C2 for the drives 12 are determined such that the contact force F adheres to the force limit value F0. In contrast, if the flag A' has the value 0, the control device executes a step S55. In step S55 the control device 3 determines—analogously to step S13—the control commands C2 for the drives 12. In contrast to step S4 and in compliance with step S13 the determination of the control commands C2 is not on the contrary limited such that the contact force F is limited to the force limit value F0.

Thanks to the procedure in FIG. 13 it is thus possible for the operator 6, depending on the situation in the individual case, to decide whether or not said operator activates the inventive method.

In summary, the present invention thus relates to the following circumstances:

A control device 3 of a production machine receives a present path B and a movement command C1 from an operator 6 via an input device 7 during manual operation of the production machine. At least one element 2 of the production machine is to be moved along the present path B in a movement direction by means of position-controlled axes 1. The control device 3 determines a series of position setpoint values x* for the axes 1 on the basis of the movement command C1. The position setpoint values x* advance with a setpoint velocity v* in the movement direction along the present path B. The control device 3 determines, on the basis of the position setpoint values x* and corresponding position actual values x, control commands C2 for the drives 12 driving the axes 1 and controls the drives 12 accordingly. The control device 3 determines the control commands C2 such that a contact force F, with which the at least one element 2 acts on its environment, is limited to a force limit value F0 specified to the control device 3. The control device 3 monitors a following error δx of the drives 12 for adherence to a predefined maximum value MAX and suppresses further movement of the at least one element 2 of the production machine if the maximum value MAX is reached.

The present invention has many advantages. In particular it results in each case in a behavior of the production machine in which elements 2 of the production machine are damaged only slightly, if at all. This even applies if because of another accident the geometry of the production machine or of the workpiece has already changed.

Although the invention has been illustrated and described in closer detail by the preferred exemplary embodiment, the invention is not restricted by the disclosed examples and other variations can be derived herefrom by the person skilled in the art, without departing from the scope of protection of the invention.

The invention claimed is:

1. A method for operating a control device for a production machine, comprising:
receiving, during manual operation of the production machine, with the control device from an operator of the production machine via an input device of a human-machine interface a present path and a movement command,
based on the movement command, determining with the control device a sequence of position setpoint values for position-controlled axes configured to move at least one element of the production machine along the present path in a movement direction, with the position setpoint values advancing with a setpoint velocity in the movement direction along the present path,
determining with the control device, based on the position setpoint values and corresponding position actual values, control commands for drives driving the axes such that a contact force, with which the at least one element acts on its environment, is limited to a force limit value specified to the control device, and
controlling the drives by
determining, with position controllers assigned to the drives, based on the position setpoint values and the corresponding position actual values velocity setpoint values for velocity controllers subordinate to the position controllers,
determining, based on the velocity setpoint values and corresponding velocity actual values, force setpoint values for force controllers subordinate to the velocity controllers and disposed upstream of the drives,
limiting, with limiters located between the position controllers and the force controllers, the force setpoint values to the force limit value specified to the control device or to a value derived therefrom, and
determining the control commands for the drives by means of the force controller, and
monitoring, with the control device, a following error of the drives, the following error being a difference between the position setpoint values and position actual values, for adherence to a predefined maximum value and suppressing further movement of the at least one element of the production machine when the predefined maximum value is reached.

2. The method of claim 1, further comprising:
limiting a magnitude of the contact force,
limiting the contact force of particular components for particular position-controlled axes, or
limiting the contact force of particular components for mutually orthogonal directions.

3. The method of claim 1, wherein the position controllers are associated with the drives and the force controllers are directly or indirectly subordinate to the position controllers, and the position controllers are embodied as proportional (P) controllers.

4. The method of claim 1, further comprising:
receiving, with the control device, a measurement value for a movement force applied by the drives on the at least one element,
determining, with the control device, from the received measurement value the contact force, and
suppressing, with the control device, a further movement of the at least one element in the movement direction when the determined contact force reaches the specified force limit value.

5. The method of claim 4, further comprising:
determining, with the control device, an acceleration or the movement velocity of the at least one element based on the position actual values of the axes, and
when determining the contact force, determining, with the control device, a force component of the movement force caused by the acceleration or the velocity of the at least one element.

6. The method of claim 1, further comprising limiting the setpoint velocity to a velocity limit value specified to the control device.

7. The method of claim 1, further comprising:
monitoring, with the control device, the contact force, and
reversing, with the control device, when the specified force limit value is reached, the movement direction, a direction of the setpoint velocity or a direction of a setpoint force.

8. The method of claim 1, further comprising:
temporarily storing in a buffer memory of the control device sequentially a series of position setpoint values and/or the associated position actual values, and
when the at least one element of the production machine moves in opposition to the movement direction following the movement of at least one element of the production machine in the movement direction, utilizing the position setpoint values and/or position actual values stored in the buffer memory in a sequence that is inverse compared to the sequentially stored series.

9. The method of claim 1, further comprising displaying, with the control device, to the operator via the human-machine interface the contact force, as an absolute value, component-by-component for the individual axes, or component-by-component for mutually orthogonal directions.

10. The method of claim 1, further comprising for specifying the movement command, applying, with the control device, to an actuating element a haptically detectable acknowledgment that depends on the contact force.

11. The method of claim 1, further comprising executing the method only in response to the control device having received an activation command from the operator via the human-machine interface.

12. A control program product for a control device of a production machine, wherein the control program product is embodied on a non-transitory machine-readable medium and comprises machine code which when executed by the control device causes the control device to operate the production machine by:
receiving, during manual operation of the production machine, from an operator of the production machine via an Input device of a human-machine Interface a present path and a movement command,
based on the movement command, determining a sequence of position setpoint values for position-controlled axes configured to move at least one element of the production machine along the present path in a movement direction, with the position setpoint values advancing with a setpoint velocity in the movement direction along the present path, determining, based on the position setpoint values and corresponding position actual values, control commands for drives driving the axes such that a contact force, with which the at least one element acts on its environment, is limited to a force limit value specified to the control device, and controlling the drives by
 determining, with position controllers assigned to the drives, based on the position setpoint values and the corresponding position actual values velocity setpoint values for velocity controllers subordinate to the position controllers,
 determining, based on the velocity setpoint values and corresponding velocity actual values, force setpoint values for force controllers subordinate to the velocity controllers and disposed upstream of the drives,
 limiting, with limiters located between the position controllers and the force controllers, the force setpoint values to the force limit value specified to the control device or to a value derived therefrom, and
 determining the control commands for the drives by means of the force controller, and monitoring a following error of the drives, the following error being a difference between the position setpoint values and position actual values, for adherence to a predefined maximum value and suppressing further movement of the at least one element of the production machine when the predefined maximum value is reached.

13. A control device for a production machine, wherein the control device is configured to operate the production machine by receiving, during manual operation of the production machine, from an operator of the production machine via an input device of a human-machine interface a present path and a movement command, based on the movement command, determining a sequence of position setpoint values for position-controlled axes configured to move at least one element of the production machine along the present path in a movement direction, with the position setpoint values advancing with a setpoint velocity in the movement direction along the present path, determining, based on the position setpoint values and corresponding position actual values, control commands for drives driving the axes such that a contact force, with which the at least one element acts on its environment, is limited to a force limit value specified to the control device, and controlling the drives by
 determining, with position controllers assigned to the drives, based on the position setpoint values and the corresponding position actual values velocity setpoint values for velocity controllers subordinate to the position controllers,
 determining, based on the velocity setpoint values and corresponding velocity actual values, force setpoint values for force controllers subordinate to the velocity controllers and disposed upstream of the drives,
 limiting, with limiters located between the position controllers and the force controllers, the force setpoint values to the force limit value specified to the control device or to a value derived therefrom, and
 determining the control commands for the drives by means of the force controller, and monitoring a following error, the following error being a difference between the position setpoint values and position actual values, of the drives for adherence to a predefined maximum value and suppressing further movement of the at least one element of the production machine when the predefined maximum value is reached.

14. A system, comprising
a production machine having at least one position-controlled axis constructed to move at least one element of the production machine in a position-controlled manner, and
a control device as set forth in claim 13.

15. The method of claim 1, wherein a maximum permissible distance between immediately consecutive position setpoint values is adhered to and the position setpoint values are generated on a clocked basis.

16. The control program product of claim 12, wherein a maximum permissible distance between immediately consecutive position setpoint values is adhered to and the position setpoint values are generated on a clocked basis.

17. The control device of claim 13, wherein a maximum permissible distance between immediately consecutive position setpoint values is adhered to and the position setpoint values are generated on a clocked basis.

\* \* \* \* \*